E. S. PRIDHAM.
TELEPHONE TRANSMITTER.
APPLICATION FILED MAY 7, 1918.

1,430,257.

Patented Sept. 26, 1922.

INVENTOR.
Edwin S. Pridham
BY
Strong & Townsend
ATTORNEY

Patented Sept. 26, 1922.

1,430,257

UNITED STATES PATENT OFFICE.

EDWIN S. PRIDHAM, OF OAKLAND, CALIFORNIA, ASSIGNOR TO THE MAGNAVOX COMPANY, OF SAN FRANCISCO, CALIFORNIA, A CORPORATION OF ARIZONA.

TELEPHONE TRANSMITTER.

Application filed May 7, 1918. Serial No. 233,134.

*To all whom it may concern:*

Be it known that I, EDWIN S. PRIDHAM, a citizen of the United States, residing at Oakland, in the county of Alameda and State of California, have invented new and useful Improvements in Telephone Transmitters, of which the following is a specification.

This invention relates to telephones and especially to the transmitting element thereof.

In application Ser. No. 187,361, filed August 21st, 1917, by Edwin S. Pridham and Peter L. Jensen and in application Ser. No. 210,081, filed January 2nd, 1918, by Peter L. Jensen, there is disclosed a method of, and means for, telephonically transmitting speech in an environment of extraneous noise. In both these cases the transmitter is shown with a very open construction, exposing the diaphragm and button to the elements as fully as possible in order that the vibrations, due to the noise, may have free acess to both sides of the diaphragm.

In practice, the transmitters have been used with great success with practically no variation in construction, as shown in the above applications. However, notwithstanding the success of the transmitter in eliminating the effect of extraneous noise, it is very desirable to protect the diaphragm and button, from the wind which at times reaches a terrific velocity, from water and from mechanical injury. The means whereby these ends are accomplished while at the same time maintaining the highly desirable anti-noise characteristics of the transmitter, is the subject of the present invention.

Having reference to the accompanying drawings.

Figure 1:
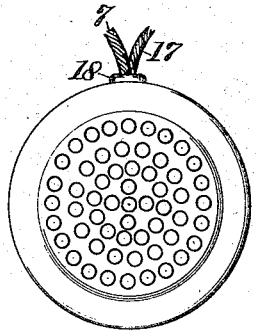
Fig. 1 shows a plan view of the transmitter.
Figure 2:
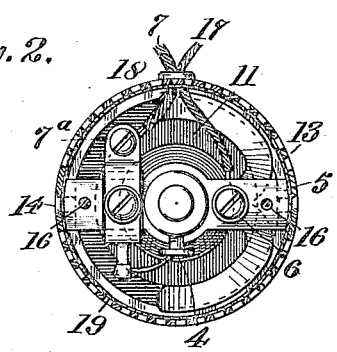
Fig. 2 shows a partial cross section in plan view.
Figure 3:
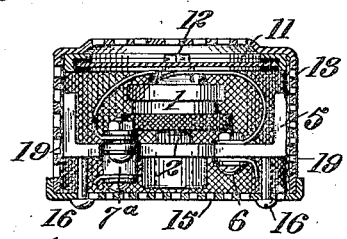
Fig. 3 shows a cross section in elevation.
Figure 4:
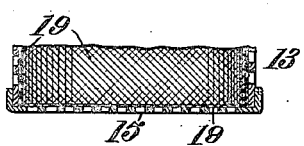
Fig. 4 shows a partial cross section of the casing.

The transmitter must have its diaphragm exposed nearly equally on both sides to the extraneous vibrations and at the same time the diaphragm and electrode button should be protected from accidental injury. For these reasons, the diaphragm, the electrode button and the supporting bridge are completely enclosed in a casing which effectively protects the button and diaphragm from accidental contact with anything which might injure them. This casing as is shown, is punched full of holes over its entire surface, only enough material being left to effectively hold the bridge and diaphragm in place, and maintain a guard around the delicate parts of the apparatus. The upper part of the casing forms a seat for the diaphragm and this upper end is formed to allow a sufficient vibration of the diaphragm to take place. Now in order to protect the diaphragm from the wind which would whistle through these holes and from water which would be very detrimental to the electrode, the entire inside of the casing is lined with a very thin oiled silk which is stretched tight over all the exposed surfaces of the casing. The oiled silk, while freely permitting the sound vibrations to pass into the transmitter very effectively, keeps out the wind and the water. The outside of the casing is made as smooth as possible to avoid noises due to the rushing past of the wind. The bushing in the casing for the cord, is made water-tight so that the transmitter as a whole is waterproof.

Referring to the drawings, the numerals denote corresponding parts in all the figures.

The transmitter button 1 is provided with a shank 2, which is adjustably held in the bushing 3 by a set screw 4. This bushing 3 is fixed in the bridge 5. One electrode of the transmitter button is grounded on the bridge to which connection is made through the terminal 6, the other electrode being connected by a conductor 7 to the terminal 7ª which is insulated from the bridge 5. The diaphragm 11 is securely fastened to the front electrode of the transmitter button 1 by means of the nut 12. The bridge 5 which supports the transmitter button 1, and the diaphragm, is securely mounted within the perforated casing 13 by means of the screws 14. The front of the casing 13 is formed out to make a seat for the diaphragm 11, and allow space for the vibration of the same. When the bridge with its button and diaphragm is mounted within the casing, the perforated back 15 is held to the casing by the screws 16 which engage the bridge piece 5. The interior of the perforated casing 13, and the back 15, is completely lined with oiled silk 19, or other material which offers a minimum resistance to sound vibrations, but which effectively keeps out wind and water. The connecting cord 17 for the transmitter is led through the bushing 18 located in the perforated casing 13.

It will be seen that the construction of the transmitter is such as to be durable, wind-proof, water-proof and to have the anti-noise characteristics which is such a desirable feature in the transmitters of this type.

Having thus described my invention, what I claim and desire to secure by Letters Patent is—

1. In a transmitter for telephonic communication, a variable resistance element, a diaphragm for said element, a bridge for said element and its diaphragm, and a perforated casing surrounding said element and its diaphragm within which the bridge is mounted, said casing acting as a guard for the diaphragm and variable resistance element and permitting free access of sound vibrations to both sides of said diaphragm.

2. In a telephone transmitter for use in excessively noisy places having a diaphragm substantially equally exposed on both sides to undesirable noise vibrations, a variable resistance element to which said diaphragm is attached, a bridge for the support of said variable resistance element, a perforated casing completely surrounding said diaphragm, variable resistance element and bridge, and a thin flexible lining for said perforated casing to permit free access of sound vibrations, and of such a character to keep out wind and water.

3. In a telephone transmitter including a diaphragm, a variable resistance element and a supporting bridge, a perforated casing completely surrounding said transmitter elements, and a non-perforated flexible lining completely covering the said perforated casing for allowing free access of sound vibrations to the interior of said casing, but preventing the entering of wind and water substantially as described.

4. In a telephone transmitter, the combination with a variable resistance element and a diaphragm for actuating said element, of a thin flexible impervious membrane completely surrounding said element and its diaphragm.

5. In a telephone transmitter, the combination with a variable resistance element, a diaphragm for the actuating of said element, a bridge for the mounting of said element and its diaphragm, and a partial casing for the support of said bridge, of a thin flexible impervious membrane covering for said casing, said membrane enveloping said diaphragm and variable resistance element for the exclusion of wind and water therefrom and being of such texture as to freely pass sound vibrations.

6. In a telephone transmitter for use in excessively noisy places having a diaphragm substantially equally exposed on both sides to undesirable noise vibrations, a variable resistance element to which said diaphragm is attached, and a perforated casing completely surrounding said diaphragm and variable resistance element.

7. In a telephone transmitter for use in excessively noisy places having a diaphragm substantially equally exposed on both sides to undesirable noise vibrations, a variable resistance element to which said diaphragm is attached, a perforated casing completely surrounding said diaphragm and variable resistance element, and a thin flexible lining for said perforated casing to permit free access of sound vibrations and of such character as to keep out wind and water.

8. In a telephone transmitter, the combination with a variable resistance element, a diaphragm and a mounting for the support of said diaphragm and variable resistance element, of a perforated casing surrounding said diaphragm, and a thin flexible lining for said perforated casing.

9. In a telephone transmitter, the combination of an apertured casing, a diaphragm supported near the front of the casing, a carbon resistance device for converting sound vibrations of the diaphragm into electrical vibrations, a physical connection between said device and the diaphragm, the parts within the casing being constructed and arranged to admit of substantially free access to the rear of the diaphragm of sound waves passing through the perforate casing, and means for partially obstructing the front of the diaphragm in respect to access of sound vibrations.

In testimony whereof I have hereunto set my hand in the presence of two subscribing witnesses.

EDWIN S. PRIDHAM.

Witnesses:
JOHN H. HERRING,
W. W. HEALEY.